May 2, 1961 A. F. SHUGART 2,982,946

ACCESS SELECTION CIRCUIT

Filed March 6, 1957 4 Sheets-Sheet 1

INVENTOR.
ALAN F. SHUGART
BY John B. Clark
ATTORNEY

May 2, 1961 A. F. SHUGART 2,982,946

ACCESS SELECTION CIRCUIT

Filed March 6, 1957

4 Sheets-Sheet 2

May 2, 1961 A. F. SHUGART 2,982,946

ACCESS SELECTION CIRCUIT

Filed March 6, 1957 4 Sheets-Sheet 3

May 2, 1961 A. F. SHUGART 2,982,946
ACCESS SELECTION CIRCUIT
Filed March 6, 1957 4 Sheets-Sheet 4
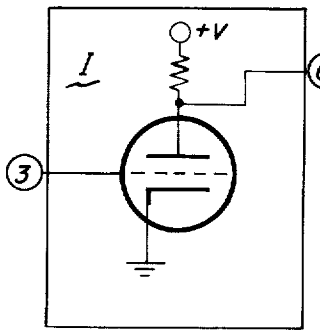
FIG. 4
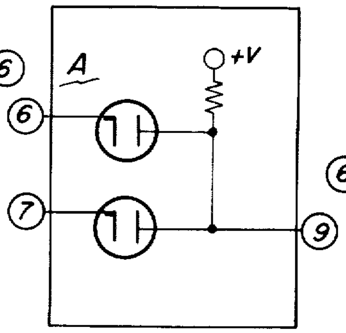
FIG. 5
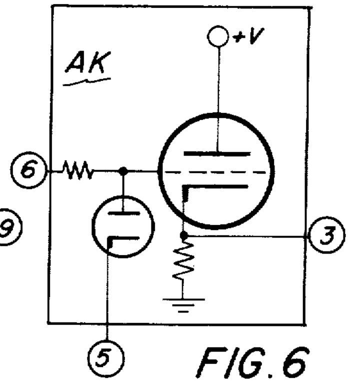
FIG. 6
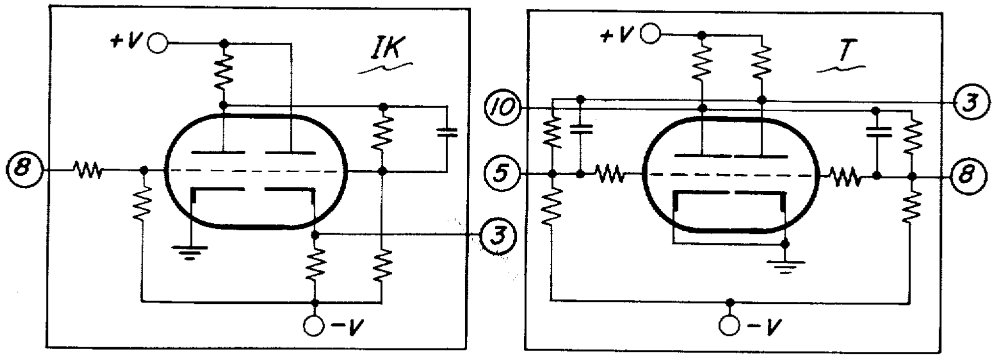
FIG. 7, FIG. 8
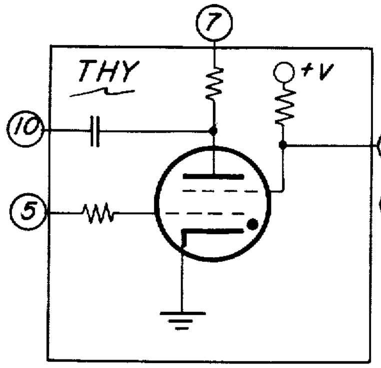
FIG. 9
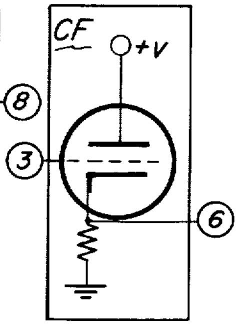
FIG. 10
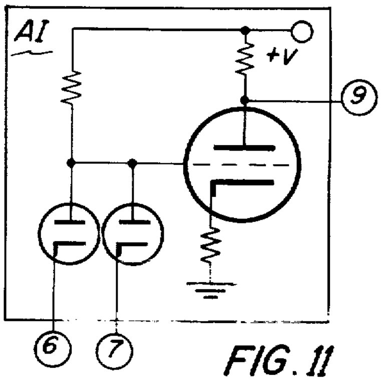

United States Patent Office 2,982,946
Patented May 2, 1961

2,982,946

ACCESS SELECTION CIRCUIT

Alan F. Shugart, Santa Clara County, Calif., assignor to International Business Machines Corporation, New York, N.Y., a corporation of New York Filed Mar. 6, 1957, Ser. No. 644,302

2 Claims. (Cl. 340—172.5)

The present invention pertains generally to storage devices for data processing machines and relates more particularly to multiple access storage devices.

In storage devices of the type disclosed in the copending application Serial No. 477,468 filed December 24, 1954, wherein magnetic transducers are positionable to selected magnetic data storage tracks of selected discs in an array of discs, it has been found desirable to reduce the access time to selected data. To this end a plurality of access mechanisms has been provided. When operated according to the present invention, this results in substantially reducing the effective access time. Thus, it is an object of the present invention to provide improved access to stored data.

Another object is to provide a novel means for operating a plurality of accesses to stored data.

In the present embodiment mechanism is shown and/or described for operating two access mechanisms for sequentially rendering the transducers associated therewith operable. The accesses are operable under control of addresses entered therein to position the associated transducers according to the entered addresses, and while one transducer arrangement is being positioned, the second may be disposed for transducing data to and from the record corresponding to a previously entered address. Each access is provided with a register for storing the corresponding addresses, which addresses are developed and entered in an address buffer in a manner such as is taught in the copending application Serial No. 565,293 filed January 24, 1956. Means are provided for alternately entering new addresses from the buffer into the registers when such addresses are entered into the buffer, which means are additionally operable to switch the transducer circuits. Assuming, therefore, that accesses A and B are positioned for use in connection with two successive operations, i.e., that access A is positioned for use in connection with one operation and that access B is positioned for use with the next following operation, as soon as the first operation is completed, an address corresponding to a third operation may be sent to the buffer. The buffer is arranged to enter this address into the A register for repositioning access A while access B is held. As soon as the new address is entered into the A register, access A commences its positioning operation and the transducer associated with access B is rendered operative. Also, at this time the B register is switched to receive the next address entered into the buffer.

Another object, therefore, is to provide a device for alternately controlling the positioning of access mechanisms which are alternately used for access to stored data.

A further object is to provide registers for controlling alternately used access mechanisms wherein the register associated with the mechanism in use is arranged for receiving repositioning instructions.

Still another object is to provide means for operating sequentially active access devices having corresponding registers for sequentially receiving address instructions wherein the entry of address instructions into one of the registers renders the other register active to receive the next following address instruction and additionally renders the access mechanism associated with said other register active.

Other objects of the invention will be pointed out in the following description and claims and illustrated in the accompanying drawings, which disclose, by way of example, the principle of the invention and the best mode which has been contemplated of applying that principle.

In the drawings:

Fig. 1*a* is a schematic diagram of the address buffer of the invention.

Fig. 1*b* is a schematic diagram of the address registers of the invention.

Figs. 4 through 11 are schematic diagrams of the electronic components shown in block form in Figs. 1 and 2.

Figure 3:
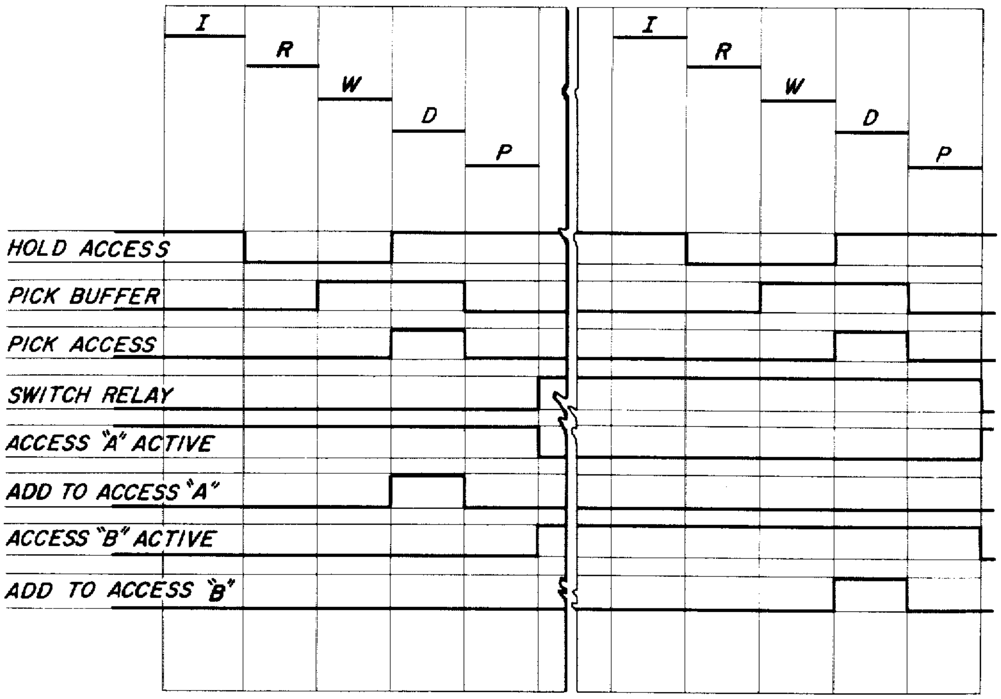
Fig. 3 is a timing diagram of the invention.

Referring now to the drawings, the present invention is shown and described as being operated by certain control and data signals which may be developed in any convenient manner. For example, these signals may be generated according to the teachings of the aforementioned application Serial No. 565,293, and in the present description it will be assumed that these signals are developed by a machine similar to this one. It will be understood, however, that this reference is given solely to permit a better understanding of the operation of the invention and that it is not intended to limit the scope thereof since many applications as well as operating mechanisms for the invention will be obvious to those skilled in the art. Thus, the basic timing (see Fig. 3) for operating the present embodiment of the invention includes five basic timing cycles, the instruction or I cycle, the read or R cycle, the write or W cycle, a delay or D cycle, and a cycle referred to herein as the P cycle which, for the purposes of this description, may be assumed to be another delay cycle. During the I cycle, instructions for the next following operation are generated for controlling data transfer during that operation. Thus, during the R cycle data determined by the corresponding instruction is read and during the W cycle this data is written at the address controlled by this instruction.

Figure 1A:
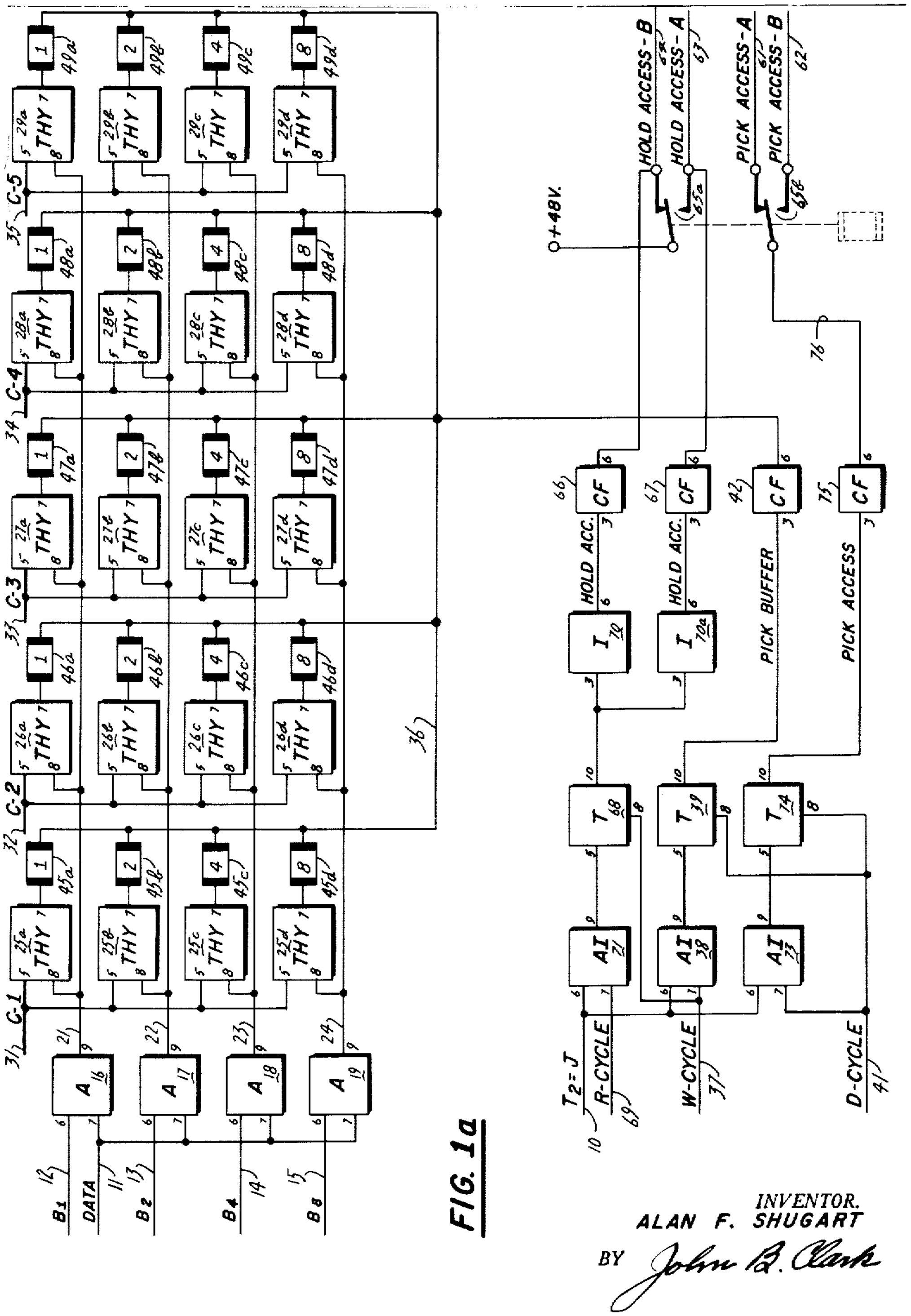
Figure 1B:
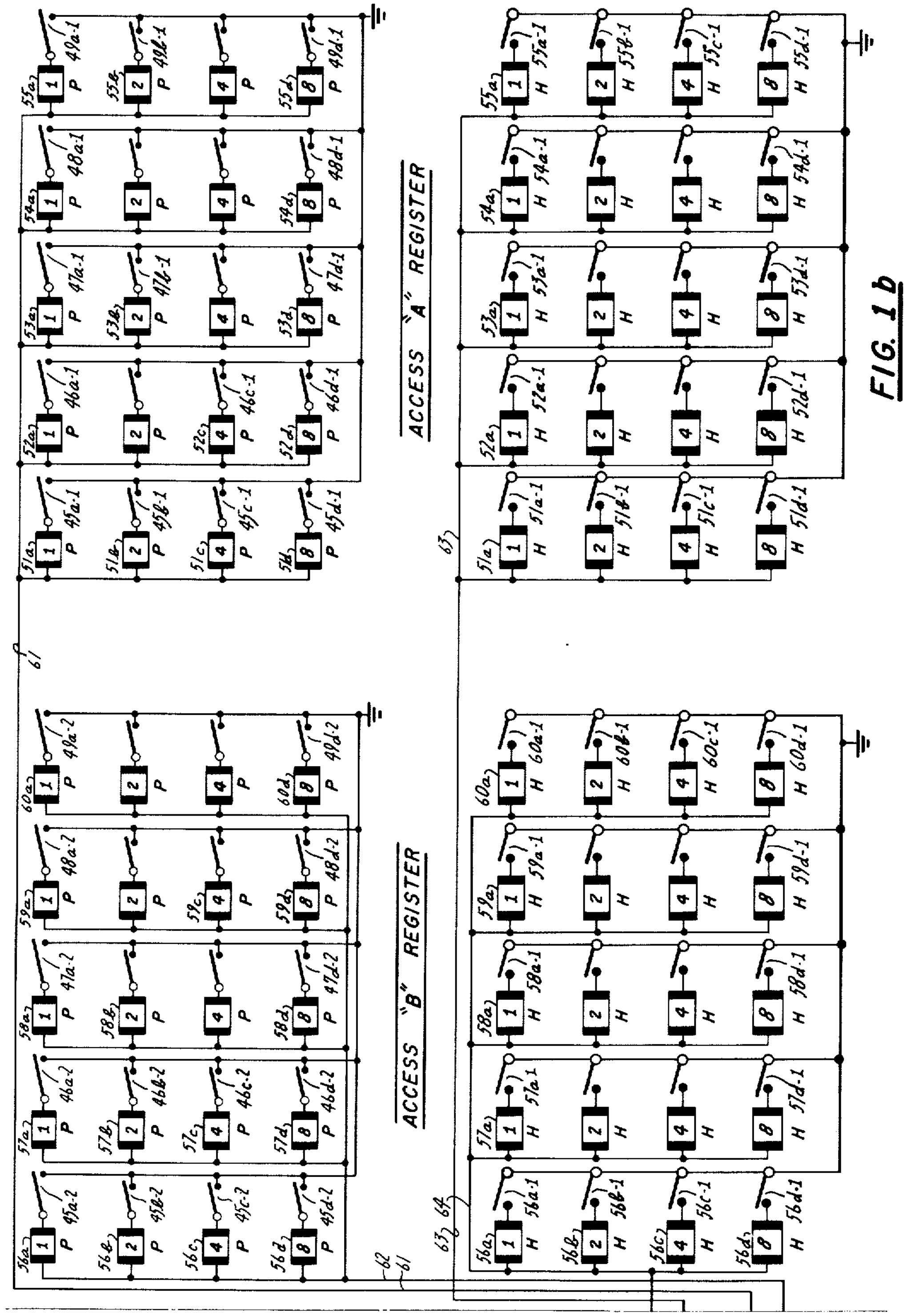

Throughout this description it will be further assumed that two access mechanisms are involved, although it will be clear that more may be provided according to the problem to be met. These access mechanisms are referred to as access A and access B and the corresponding address registers are shown in Fig. 1*b*. It is also assumed that a five-digit address is necessary to position an access to the desired location and for this reason the address buffer (Fig. 1*a*) and address registers (Fig. 1*b*) are provided with five digits of storage. It should be noted at this time that the various electronic components of the invention are shown in block form, the detailed circuitry thereof being shown in Figs. 4 through 11. The operation of each of these units is well known and will not be described further herein.

When an instruction calls for a new address to be entered into one of the registers, a signal referred to as "$T_2$=J" is generated, thereby raising the potential of a line 10 (Figs. 1*a* and 2) during the I cycle. Additionally, during the W cycle the five digits of the new address are entered serially on a line 11 (Fig. 1*a*) in timed relation with timing pulses identified as $B_1$, $B_2$, $B_4$ and $B_8$, which pulses are sequentially present on lines 12, 13, 14 and 15, respectively. The timing pulses and the address data are mixed in corresponding "and" gates 16 through 19, and the signals taken from the #9 taps of these gates correspond to the addresses, all "1" bits being entered on a line 21, "2" bits being entered on a line 22, "4" bits being entered on a line 23 and "8" bits being entered on a line 24. The lines 21 through 24, therefore, comprise the input to the address buffer.

The address buffer includes five groups of thyratron tubes for storing the five characters of an address and each group is provided with four tubes for storing the four bits associated with each character position. These groups are identified by the reference numerals 25 through 29. Thus, the line 21 is connected to the #8 tap of each of the five thyratron units 25*a* through 29*a*; similarly, the line 22 is connected to the #8 tap of each of the thyratron units 25*b* through 29*b*, etc. The #5 taps of the thyratrons of each group are connected to a corresponding character signal line 31 through 35. The lines 31 through 35 are arranged to rise during the corresponding character time of the address being entered, thereby raising the second input to each order of the buffer during the character time associated therewith. Each of the aforementioned thyratron units is arranged to fire when the #5 and #8 taps thereof are high as long as a line 36 is high since the line 36 is connected through the corresponding relays 45 through 49 to the #7 tap of each of the various thyratrons 25 through 29. Thus, it will now be clear that when the address is entered on the line 11 and when the line 36 is high, relays 45 through 49 are picked according to the address data and that these relays are held as long as the line 36 remains high.

W cycle pulses appear on a line 37 which is connected to the #7 tap of an "and" circuit 38, the #6 tap of which is the $T_2$=J line 10. The output of the unit 38 is connected to the #5 tap of a trigger 39, the #8 tap of which is connected to the D cycle line 41. The #10 tap of the trigger 39 connects through a cathode follower 42 to the line 36. The #10 tap of the trigger 39 is reset low by the trailing edge of the D cycle signal and is operated to reverse this condition when the #5 tap thereof drops. This occurs on the beginning of the W cycle when $T_2$=J. When $T_2$=J, therefore, the trigger 39 is operated to raise the potential of the line 36 until the end of the next following D cycle. Thus, when $T_2$=J, the new address is entered into the address buffer relays during the W cycle and is held there until the beginning of the P cycle.

Registers A and B (Fig. 1*b*), like the address buffer, each include five groups of four relays per group, these groups being identified by the reference numerals 51 through 55 and 56 through 60, respectively. Each of the relays 51 through 60 is provided with both "pick" and "hold" windings, as indicated by a "P" or "H" disposed therebelow. One side of the pick winding of each of the relays 51 through 55 connects through a corresponding n/o contact of one of the relays 45 through 49 to ground, the other side of each of these relays being connected to a line 61. Similarly, one side of the pick winding of each of the access B relays is connected through another n/o contact of the corresponding relay 45 through 49 to ground, the other side of each of these relays being connected in common to a line 62.

One side of each of the hold coils of the relays 51 through 60 connects through it own n/o contacts to ground. The other side of each of the hold coils of the relays 61 through 55 is connected to a line 63, similarly, the other side of each of the hold coils of the relays 56 through 60 is connected to a line 64. The lines 63 and 64 connect through the n/o and n/c *a* contacts, respectively, of a relay 65, the operation of which will be described hereinafter. These lines additionally connect to the #6 taps of corresponding cathode followers 67 and 66, respectively. When the lines 63 and 64 are high, it will be clear that both the A and B registers are held, the line 63 being arranged to hold the A register and the line 64 being arranged to hold the B register. The potential of these lines is controlled by the relay 65, as mentioned above, as well as by the condition of a trigger 68.

The $T_2$=J line 10 and the R cycle line 69 connect to the #6 and #7 taps, respectively, of an "and" gate 71, the #9 tap of which is connected to the #5 tap of a trigger 68. The #8 tap of this trigger connects to the W cycle line 37 and the #10 tap is connected through each of two inverter units 70 and 70*a* to the #3 taps of the cathode follower units 66 and 67, respectively. The #10 tap of the trigger 68 is normally low; however, upon the occurrence of an R cycle, when $T_2$=J, the #10 tap of this trigger goes up, where it remains until the end of the following W cycle. Thus, the output of each of the cathode followers 66 and 67 is high except during the R and W cycles when $T_2$=J.

The signals taken from the #6 taps of the cathode followers 66 and 67 are utilized to hold the potential of the lines 64 and 63, respectively, high for energizing the hold coils of the various relays 51 through 60. However, when $T_2$=J, the #6 taps of the cathode followers 66 and 67 drop, thereby permitting one of the lines 63 or 64 to drop, depending upon the condition of the relay 65. When the relay 65 is in the condition shown, it will be clear that the line 63 drops during the R and W cycles when $T_2$=J, the converse being true when the relay 65 is energized. This permits the entry of new addresses into one of the registers according to the condition of relay 65. At the end of the W cycle the trigger 68 is again operated to raise the potential of both of the lines 63 and 64, thereby holding both the A and B registers.

The D cycle line 41 and the $T_2$=J line 10 connect to the #7 and #6 taps of an "and" circuit 73, the output of which is connected to the #5 tap of a trigger 74. The #8 tap of the trigger 74 is connected to the D cycle line 41. The #10 tap of the trigger 74 connects through a cathode follower 75 to a line 76 which connects through both the n/o and n/c *b* points of the relay 65 to the lines 61 and 62, respectively. The #10 tap of the trigger 74 is normally low. However, when $T_2$=J, the trigger 74 is operated at the beginning of the D cycle to raise the #10 tap. This condition exists until the end of the D cycle, at which time the #10 tap drops. Thus, when $T_2$=J, the line 76 rises for the duration of the D cycle, thereby raising the potential of one of the lines 61 or 62, depending upon the condition of relay 65, for entering the address stored in the address buffer into the pick coils of one of the registers.

The relay 65 (Fig. 2) is picked on alternate entries of addresses into the address buffer under the control of a trigger 77, as will become clear. The $T_2$=J line 10 and the D cycle line 41 connect the #6 and #7 taps, respectively, of an "and" gate 78, the #9 tap of which connects to the #5 and #8 taps of the trigger 77 as well as to the #5 tap of a trigger 79. Thus, when $T_2$=J, the #9 tap of the unit 78 drops at the beginning of the D cycle, thereby reversing the condition of the trigger 77 and operating the trigger 79 to raise the potential of the #10 tap thereof. The #3 tap of the trigger 77 connects through an IK unit 86 to the #5 tap of a thyratron 84, the #10 tap of the unit 77 being connected through an IK unit 85 to the #5 tap of a thyratron unit 83. Additionally, the #10 tap of the trigger 79 connects to the #6 tap of an AK unit 81, the #5 tap of which connects to a line 82 upon which pulses occurring at the end of P cycles appear. The #3 tap of the AK unit 81 connects to the #8 tap of each of the thyratrons 83 and 84.

Figure 2:
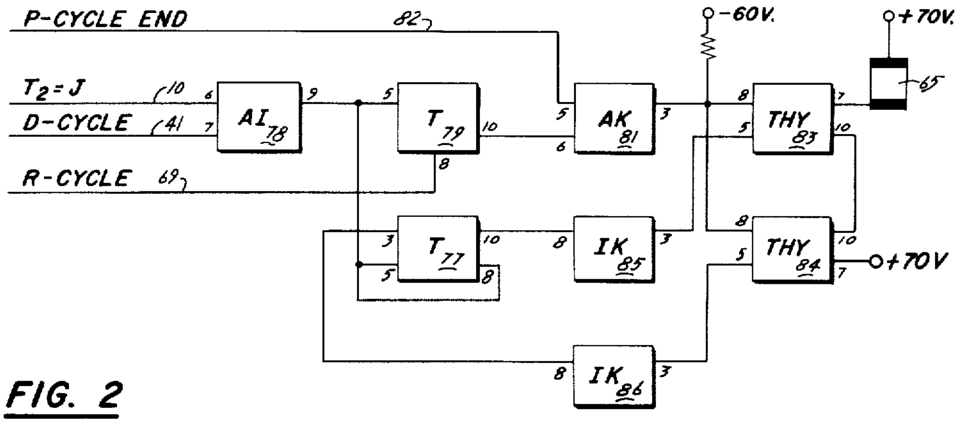
Fig. 2 is a schematic diagram of the switching circuitry of the invention.

Assuming that the circuitry shown in Fig. 2 is in a condition wherein the relay 65 is energized, i.e., that the thyratron 83 is conducting, the #10 tap of the trigger 77 is low, thereby rendering the #5 tap of the thyratron 83 high. When $T_2$=J, this condition is reversed and the #10 tap of this trigger goes up at the beginning of the D cycle, thereby lowering the potential of the #5 tap of the thyratron 83 and raising the potential of the #5 tap of the thyratron 84. The #8 tap of each of the thyratrons 83 and 84 is low at this time and the thyratron 83 continues to conduct, thereby maintaining the relay 65 energized until the #3 tap of the AK unit 81 goes up. Thus, at P cycle end the thyratron 84 fires. This extinguishes the thyratron 83 and causes relay 65 to drop out. It will be noted that the R cycle line 69 connects to the #8 tap of the trigger 79, and it will be clear, therefore, that upon the termination of the next following R cycle the trigger 79 is reset in a condition wherein the #10 tap thereof is low, thereby preventing further P cycle end pulses from passing through the AK unit 81 to the #8 taps of the thyratrons 83 and 84 until $T_2$=J again.

For describing the operation of the invention, assume that both accesses are at random addresses and it is desired to position them alternately at addresses sequentially entered in the address buffer. It will be further assumed that the relay 65 is initially in the deenergized condition, i.e., that the *a* and *b* contacts thereof are in the condition shown in Fig. 1*a*. It should be noted that the transducer or transducers (not shown) associated with the A and B accesses may be switched under the control of the relay 65, thereby alternately rendering these transducers operative for reading and recording data according to addresses in their respective registers. With the relay 65 in the deenergized condition, it will be assumed that the transducers associated with access A are operative. When a new address is to be sent to the address buffer, i.e., when $T_2$=J, the line 10 (Fig. 1*a*) goes up and at the beginning of the R cycle the line 69 goes up, thereby reversing the condition of the trigger 68 and raising the potential of the #10 tap thereof. This causes the hold voltage to be removed from the line 63 which holds access A, as described earlier. Access B remains held, however, since the line 64 connects through the n/c *a* contacts of the relay 65 to +48 volts.

At the beginning of the W cycle the line 37 goes up, thereby operating the trigger 39 to raise the potential of the #10 tap and raising the line 36 to permit the address data taken from the line 11 to be entered into the various relays 45 through 49 of the buffer according to the data. At the beginning of the D cycle the trigger 74 is operated, thereby raising the potential of the line 76 which connects through the n/c *b* points of the relay 65 and through the line 61 to the pick coils of the relays associated with the A register. At this time, therefore, those relays associated with access A corresponding to picked relays of the address buffer are energized. Just prior to this time at the end of the W cycle the trigger 68 was again operated, thereby lowering the potential of the #10 tap thereof and reapplying the hold voltage to both of the lines 63 and 64. Thus, when access A picks it is held since the line 63 is again high. Thus far, the new address has been entered into the A register.

At P cycle end the line 82 (Fig. 2) rises and since the trigger 79 was operated at the beginning of the immediately preceding D cycle, the P cycle end pulse raises the potential of the #8 taps of the thyratrons 83 and 84. At this time the trigger 77 is in a condition wherein the #10 tap thereof is low, thereby making the #5 tap of the thyratron 83 high and the #5 tap of the thyratron 84 low. Thus, at P cycle end the thyratron 83 fires, thereby energizing the relay 65 and transferring its *a* and *b* contacts. It should be noted that the trigger 79 was reset to render the #10 tap thereof low at the end of a preceding R cycle since the #8 tap thereof is connected to the R cycle line 69. Thus, when $T_2$=J, the relay 65 is energized at P cycle end. Additionally, it should be noted that the transducers associated with the B access are rendered operative at this time.

When $T_2$=J again, a similar procedure is followed. The new address is entered into the address buffer during the W cycle and is entered into the access B register during the D cycle, the old address in access B having been dropped out during the preceding R cycle. At P cycle end the line 82 again rises, thereby rising the potential of the #8 tap of each of the thyratrons 83 and 84. This time the trigger 77 is in a condition wherein the #3 tap thereof is low, thereby raising the potential of the #5 tap of the thyratron 84. At P cycle end, therefore, the thyratron 84 fires, extinguishing the thyratron 83 and causing the relay 65 to drop out. This causes the transducers associated with access A to be rendered operative again and sets the *a* and *b* points of the relay 65 to enter the next new address into the A register.

It should now be clear that when both registers have been loaded, successive addresses are entered alternately into the A and B registers. Additionally, when a given set of transducers is operative according to the condition of the relay 65, the register associated with those transducers is conditioned to receive the next new address. As soon as the new addreess is entered into that register, the transducers associated with the other register are switched into the circuit and the other register is connected for receiving the next new address.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A circuit for addressing access mechanisms comprising a buffer register including a plurality of relays operable in response to signal sets entered therein, first and second storage registers each of which includes a plurality of relays corresponding to relays of said buffer register, the pick circuits of each of the relays of each of said storage registers including the normally open points of a corresponding buffer relay, means for supplying operating potential to the pick circuits of relays of one of said storage registers according to the condition of a bistable device, said means being connected to supply said operating potential to said relays of said first storage register when said bistable device is in a first condition and to supply said operating potential to said relays of said second storage register when said bistable device is in a second condition, a holding circuit for each relay of each of said storage registers for holding relays operated by said operating potential, said holding circuits being operative in response to the condition of said bistable device for holding relays of said first storage register when said bistable device is in said second condition and for holding relays of said second storage register when said bistable device is in said first condition, said holding circuits being additionally operative to hold operated relays of both of said storage registers after said buffer register relays are operated and until just prior to the entry of another signal set into said buffer register relays, and means responsive to the entry of a signal set in said buffer register for reversing the condition of said bistable device while the operated relays of both of said storage registers are held.

2. A circuit for addressing access mechanisms comprising a buffer register, means connected to enter indicia of address data in said buffer register during a first cycle, means holding said address data indicia in said buffer register during said first cycle and during a second cycle following said first cycle, a first address entry register under control of said buffer register and responsive to a first control signal for entering said address data indicia stored in said buffer register into said first address entry register during said second cycle, a first address holding register under control of said first address entry register and responsive to a second or a third control signal for holding said address data indicia, a second address entry register under conrtol of said buffer register and responsive to said second control signal for entering said address data indicia stored in said buffer register into said second address entry register, a second address holding register under control of said second address entry register and responsive to said first control signal or said third control signal for holding said address data indicia, means generating said first and second control signals including a bistable device operable to assume opposite states of stability after said second cycle and in response to the entry of address data indicia in said buffer register, one condition of said bistable device controlling the generation of said first control signal and the other condition of said bistable device controlling the generation of said second control signal, and means generating said third control signal except during said first cycle and a third cycle preceding said first cycle, whereby address data indicia entered into said buffer register during said first cycle are entered into said first or second address entry register during said second cycle according to the condition of said bistable device.

References Cited in the file of this patent

UNITED STATES PATENTS 2,636,672 Hamilton et al. ---------- Apr. 28, 1953

OTHER REFERENCES

Review of Input and Output Equipment Used in Computing Systems, Joint AIEE-IRE-ACM Computer Conference, March 1953, published by American Institute of Electrical Engineers, 33 W. 39th St., New York, N.Y., pp. 133–137.